US011216036B2

(12) United States Patent
Chang (10) Patent No.: US 11,216,036 B2
(45) Date of Patent: Jan. 4, 2022

(54) ELECTRONIC DEVICE

(71) Applicant: BEIJING XIAOMI MOBILE SOFTWARE CO., LTD., Beijing (CN)

(72) Inventor: Cheng Chang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 67 days.

(21) Appl. No.: 16/693,348

(22) Filed: Nov. 24, 2019

(65) Prior Publication Data

US 2020/0363674 A1     Nov. 19, 2020

(30) Foreign Application Priority Data

May 17, 2019   (CN) .......................... 201910412680.0

(51) Int. Cl.
*G06F 1/16* (2006.01)
*G02F 1/1333* (2006.01)

(52) U.S. Cl.
CPC ...... *G06F 1/1652* (2013.01); *G02F 1/133305* (2013.01); *G02F 1/133308* (2013.01); *G02F 1/133345* (2013.01)

(58) Field of Classification Search
CPC ............ G06F 1/1652; G02F 1/133305; G02F 1/133308; G02F 1/133345
See application file for complete search history.

(56) References Cited

U.S. PATENT DOCUMENTS

| | | | | |
|---|---|---|---|---|
| 7,558,057 | B1* | 7/2009 | Naksen | G06F 1/1613 361/679.3 |
| 8,711,566 | B2* | 4/2014 | O'Brien | G06F 1/1624 361/724 |
| 8,811,032 | B2* | 8/2014 | Ladouceur | G06F 1/1652 361/807 |
| 9,176,535 | B2* | 11/2015 | Bohn | H04M 1/0268 |
| 9,195,272 | B2* | 11/2015 | O'Brien | G06F 1/1624 |
| 9,286,812 | B2* | 3/2016 | Bohn | H04M 1/0268 |
| 9,823,697 | B2* | 11/2017 | Hsu | G06F 1/1652 |
| 10,136,524 | B2* | 11/2018 | Choi | H05K 5/0217 |
| 10,152,086 | B2* | 12/2018 | Choi | G06F 1/1652 |
| 10,194,543 | B2* | 1/2019 | Seo | H05K 5/0217 |
| 10,209,742 | B2* | 2/2019 | Shin | G06F 1/1624 |
| 10,321,583 | B2* | 6/2019 | Seo | H05K 5/0017 |
| 10,321,584 | B2* | 6/2019 | Choi | G02F 1/133305 |
| 10,448,521 | B2* | 10/2019 | Seo | G02F 1/13 |
| 10,488,959 | B2* | 11/2019 | Aurongzeb | G06F 1/1679 |
| 10,757,823 | B2* | 8/2020 | Park | H05K 5/0217 |

(Continued)

OTHER PUBLICATIONS

OA1 for EP application 20150870.2, mailed on Jul. 27, 2020.

*Primary Examiner* — Phu Vu
(74) *Attorney, Agent, or Firm* — Syncoda LLC; Feng Ma (57) ABSTRACT

A device housing includes a front face, a rear face and a bent side face connecting the front face with the rear face, and the rear face includes a reserved region and an assembling region connected with the reserved region. The flexible screen component covers the front face, the bent side face and the assembling region, and has a display region and an extending layer protruding from the display region. Two ends of the display region are assembled and fitted with two sides of the reserved region, respectively. The retractable device is assembled in the device housing, and connected with the extending layer.

20 Claims, 4 Drawing Sheets

(56) References Cited

U.S. PATENT DOCUMENTS

| | | | | |
|---|---|---|---|---|
| 10,878,728 | B2* | 12/2020 | Yoon | G06F 1/1681 |
| 10,881,009 | B2* | 12/2020 | Jiang | H05K 5/0017 |
| 10,936,017 | B1* | 3/2021 | Choi | G06F 1/1643 |
| 10,937,393 | B2* | 3/2021 | Lee | G06F 3/147 |
| 10,955,876 | B1* | 3/2021 | Song | H04M 1/0268 |
| 2006/0176243 | A1* | 8/2006 | Yeh | H04M 1/0268 |
| | | | | 345/30 |
| 2012/0002360 | A1* | 1/2012 | Seo | G06F 1/1652 |
| | | | | 361/679.01 |
| 2012/0162876 | A1* | 6/2012 | Kim | H04M 1/0237 |
| | | | | 361/679.01 |
| 2012/0212433 | A1* | 8/2012 | Lee | G06F 3/041 |
| | | | | 345/173 |
| 2013/0058063 | A1* | 3/2013 | O'Brien | G06F 1/1652 |
| | | | | 361/807 |
| 2016/0100478 | A1* | 4/2016 | Lee | G06F 1/1626 |
| | | | | 361/749 |
| 2016/0202781 | A1* | 7/2016 | Kim | G06F 3/041 |
| | | | | 345/173 |
| 2016/0366772 | A1* | 12/2016 | Choi | G06F 1/1652 |
| 2017/0123536 | A1* | 5/2017 | Aurongzeb | G06F 1/1615 |
| 2017/0212556 | A1* | 7/2017 | Jovanovic | G06F 1/1652 |
| 2017/0364119 | A1* | 12/2017 | Lee | G06F 1/1624 |
| 2018/0014417 | A1* | 1/2018 | Seo | H05K 1/0203 |
| 2018/0077808 | A1* | 3/2018 | Seo | H05K 5/0217 |
| 2018/0098440 | A1* | 4/2018 | Choi | G06F 1/1624 |
| 2018/0103550 | A1* | 4/2018 | Seo | H01F 7/0205 |
| 2018/0103552 | A1* | 4/2018 | Seo | G06F 1/1624 |

* cited by examiner

ELECTRONIC DEVICE

CROSS-REFERENCE TO RELATED APPLICATION

The present disclosure claims priority to Chinese Patent Application No. 201910412680.0 filed on May 17, 2019, the disclosure of which is hereby incorporated by reference in its entirety.

BACKGROUND

Flexible screens have become trendy among electronic devices such as mobile phones. A display area and an overall display effect of the flexible screen can be improved with the flexible screen being fitted with a bent side face of a housing of the electronic device.

SUMMARY

The present disclosure relates to a technical field of electronic technology, and more particularly, to an electronic device.

The present disclosure provides an electronic device to enhance a connection reliability between a flexible screen component and a housing of the electronic device.

According to embodiments of the present disclosure, an electronic device is proposed, which includes an integrated flexible screen component, a device housing and a retractable device. The device housing includes a front face, a rear face and a bent side face connecting the front face with the rear face, and the rear face includes a reserved region and an assembling region connected with the reserved region. The flexible screen component covers the front face, the bent side face and the assembling region, and has a display region and an extending layer protruding from the display region. Two ends of a display region of the flexible screen component are assembled and fitted with two sides of the reserved region, respectively. The retractable device is assembled in the device housing, and connected with the extending layer.

It is to be understood that both the foregoing general description and the following detailed description are exemplary and explanatory only and are not restrictive of the present disclosure, as claimed.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

References will now be made in detail to exemplary embodiments, examples of which are illustrated in the accompanying drawings. The following description refers to the accompanying drawings in which the same numbers in different drawings represent the same or similar elements, unless specified otherwise. The implementations set forth in the following description of the exemplary embodiments do not represent all implementations consistent with the present disclosure. Instead, they are merely examples of apparatuses and methods consistent with several aspects of the present disclosure as recited in the appended claims.

A flexible screen can be included in an electronic device such as a mobile phone. A display area and an overall display effect of the flexible screen can be improved with the flexible screen being fitted with a bent side face of a housing of the electronic device. However, a stress caused by bending the flexible screen adds difficulty to assembling of the flexible screen and the housing of the electronic device, and the separation or damage of the screen and the housing of the electronic device is also frequent due to an excessive stress.

Figure 1:
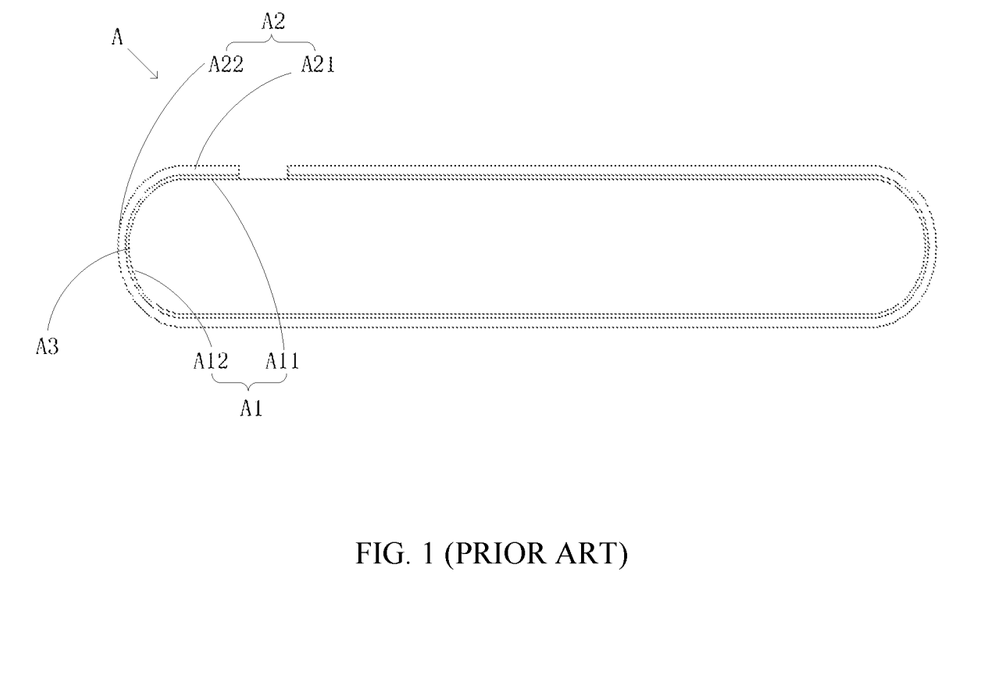
FIG. 1 is a schematic view of an electronic device in a related art.

For example, as illustrated in FIG. 1, a housing A1 of an electronic device A includes a planar region A11 and a bent region A12 connected to the adjacent planar region A11. Accordingly, the flexible screen A2 includes an integrated planar part A21 and a bent part A22. The planar part A21 and the planar region A11 of the housing A1 are bonded by an adhesive layer A3, and the bent part A22 and the bent region A12 of the housing A1 are also bonded by the adhesive layer A3. In a process of assembling the flexible screen A2 and the housing A1, because of a large stress at the bent part A22, the planar part A21 adjacent to the bent part A22 is subject to a pulling force to be fallen off from the housing A1. The flexible screen A2 is in danger of falling off, screen damages and so on, which also reduces the service life and the user experience of the electronic device A.

Figure 2:
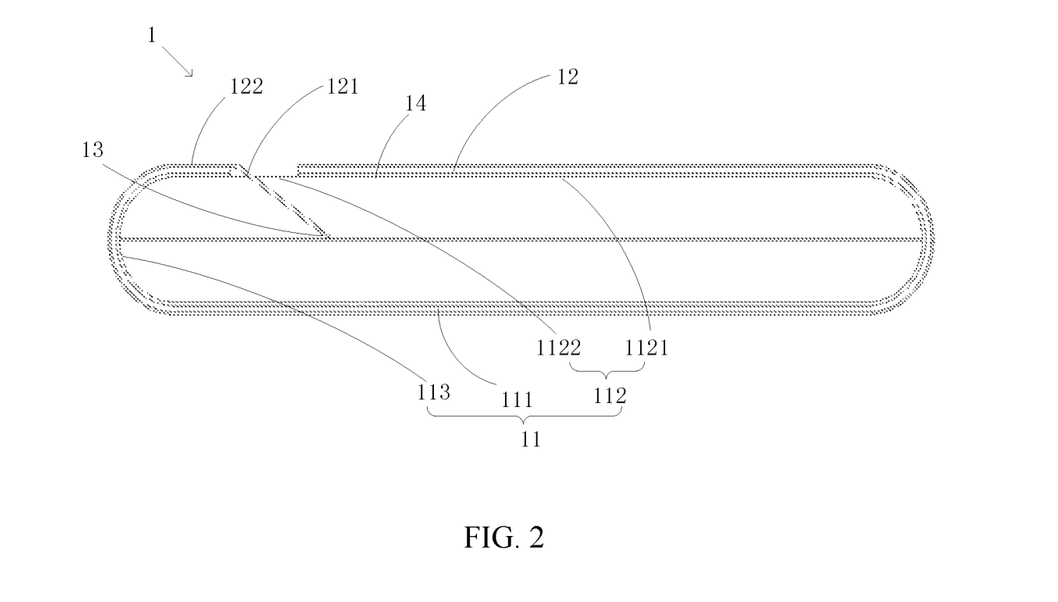
FIG. 2 is a schematic view of an electronic device in an exemplary embodiment of the present disclosure.

FIG. 2 is a schematic view of an electronic device proposed in an exemplary embodiment of the present disclosure.

As illustrated in FIG. 2, the electronic device 1 includes an integrated flexible screen component 12, a device housing 11 and a retractable device 13. The device housing 11 includes a front face 111, a rear face 112 and a bent side face 113 connecting the front face 111 with the rear face 112. The rear face 112 includes a reserved region 1122 and an assembling region 1121 connected with the reserved region 1122. The assembling region 1121 is a region of the rear face 112, which is covered by the flexible screen component 12 for supporting and assembling the flexible screen component 12.

The reserved region 1122 is a region of the rear face 112, which is not covered by the flexible screen component 12. The flexible screen component 12 covers the front face 111, the bent side face 113 and the assembling region 1121 of the rear face 112. Two ends of a display region of the flexible screen component 12 are assembled and fitted with two sides of the reserved region 1122, respectively. The retractable device 13 is assembled in the device housing 11, and the flexible screen component 12 includes an extending layer 121 protruding from the display region. The extending layer 121 is connected with the retractable device 13.

In the above embodiment, the retractable device 13 may correspond to the reserved region 1122 in terms of position, so as to facilitate the extending layer 121 of the flexible screen component 12 to extend through the reserved region 1122 to be connected with the retractable device 13.

Alternatively, the retractable device 1 may also be arranged in other positions within the device housing 11, as long as the extending layer 121 can be connected with the retractable device 13, which is not limited in the present disclosure.

By arranging the retractable device 13 in the device housing 11 and connecting the retractable device 13 with the extending layer 121 of the flexible screen component 12 in a retractable manner, the retractable device 13 pulls the flexible screen component 12 during assembling and using of the flexible screen component 12.

With the above configuration, on one hand, the assembling can be achieved by pulling the flexible screen component 12, so as to prevent a dimensional tolerance of the flexible screen component 12 from affecting its fit with the device housing 11; on the other hand, the pulling of the retractable device 13 can also overcome a separation stress caused by bending the flexible screen component 12 and improve a connection reliability between the flexible screen component 12 and the device housing 11.

In the above embodiment, the electronic device 1 also includes an adhesive layer 14, and the flexible screen component 12 is fixedly connected to the device housing 11 by means of the adhesive layer 14.

Figure 4:
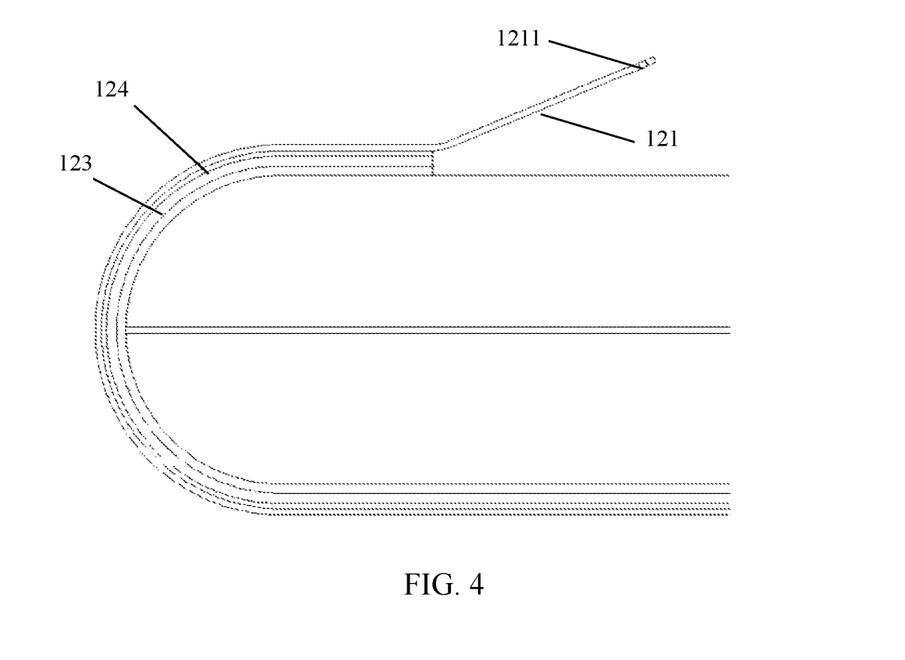
FIG. 4 is a partially enlarged view of the electronic device in FIG. 2, in which an extending layer has not been connected to a retractable device.

In some embodiments as illustrated in FIG. 4, the flexible screen component 12 further includes a cover plate layer 122, a display layer 123 and a control layer 124. In the process of assembling the electronic device 1, the cover plate layer 122, the display layer 123 and the control layer 124 of the flexible screen component 12 are firstly glued together to form a whole, and then the whole of the flexible screen component 12 is fixed at a corresponding position of the device housing 11 by means of the adhesive layer 14. The above fixing method is easy to operate and helps to reduce an assembling cost of electronic device 1.

Figure 3:
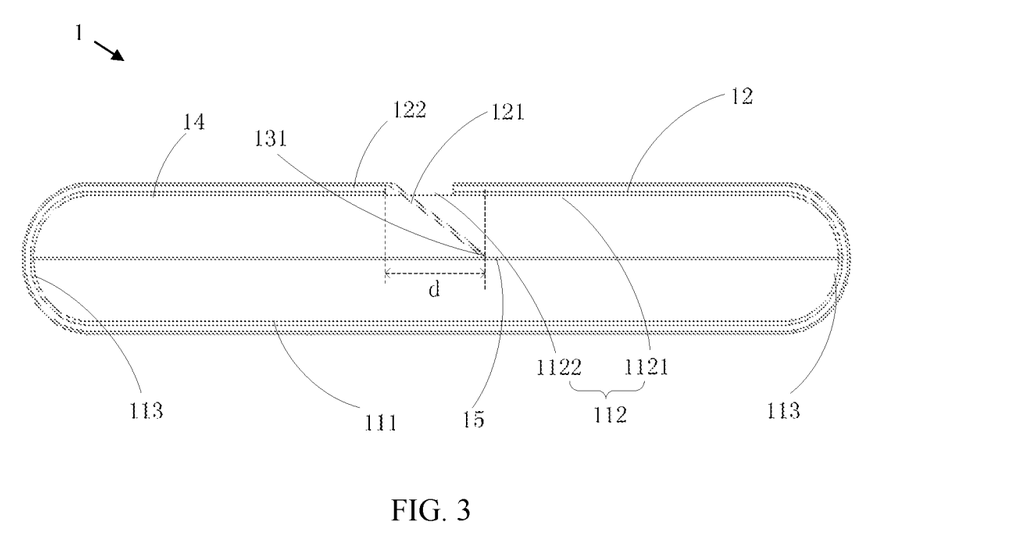
FIG. 3 is a schematic view of an electronic device in another exemplary embodiment of the present disclosure.

Furthermore, the reserved region 1122 may be used to arrange functional components of the electronic device 1, such as a camera module and a fingerprint identification module, and may also serve as a mounting position of the flexible screen component 12 and an appearance decoration position of the electronic device 1. Therefore, the reserved region 1122 may be arranged at a position on the rear face 112 adjacent to the bent side face 113, as illustrated in FIG. 2, or at a central position on the rear face 112, as illustrated in FIG. 3, which is not limited in the present disclosure.

When the reserved region 1122 is arranged at the center position on the rear face 112, the structural symmetry and aesthetics of the rear face 112 of the electronic device 1 can be improved. When the reserved region 1122 is arranged at the position on the rear face 112 adjacent to the bent side face 113, a one-side coverage area of the flexible screen component 112 on the rear face 112 is increased, a continuous screen-to-body ratio is increased, and it is convenient to mount the camera and other functional components.

Based on an arrangement location of the reserved region 1122 and the whole structure of the electronic device 1, the extending layer 121 may be selected to be arranged at least one end of the flexible screen component 12 which is connected with the retractable device 13 by means of the extending layer.

In an embodiment, as illustrated in FIG. 2, when the reserved region 1122 is arranged at the position on the rear face 112 adjacent to the bent side face 113, since the flexible screen component 12 adjacent to the bent side face 113 is subject to a large bending stress, the extending layer 121 may be provided to an end of the flexible screen component 12 which is subject to the large bending stress according to requirements, and the extending layer 121 may be connected to the corresponding retractable device 13.

The above configuration provides a counter acting force to overcome the bending stress for the flexible screen component 12 on this side. On the premise of ensuring the connection strength between the flexible screen component 12 and the device housing 11, the structure of the retractable device 13 is simplified, an internal space of the electronic device 1 occupied by the retractable device 13 is reduced, and structural improvements on the flexible screen component 22 are also reduced.

In another embodiment, as illustrated in FIG. 3, when the reserved region 1122 is arranged at the central position on the rear face 112, two bent side faces 113 of the electronic device 1 apply almost the same stresses to the flexible screen component 12, so the extending layer 121 may be provided to each end of the flexible screen component 12 according to requirements, and the two extending layers 121 may be connected to the corresponding retractable devices 13, respectively.

The above configuration provides a counter acting force to overcome the bending stress for the flexible screen component 12 on each side of the reserved region 1122, so as to avoid the falling off and the damage of the flexible screen component 12.

In the above embodiments, the extending layer 121 may be formed by extending at least one of the cover plate layer 122, the display layer 123 and the control layer 124 of the flexible screen component 12. For example, when the extending layer 121 is formed by an extension of the cover plate layer 122, a free end of the extending layer 121 is connected with the retractable device 13, such that a pulling relationship between the extending layer 121 and the cover plate layer 122 of the flexible screen component 12 may be formed, when the flexible screen component 122 is bent to have a strain.

Materials of the cover plate layer 122 may be PI (Polyimide) materials or other materials, which is not limited in the present disclosure. Alternatively, when the extending layer 121 is formed by extending the display layer 123 and the control layer 124 below the cover plate layer 122, the free end of the extending layer 121 may also be connected with the retractable device 13, so as to establish a pulling relationship between the extending layer 121 and the display layer 123, the control layer 124 of the flexible screen component 12 when the flexible screen component 12 is bent to have a strain, by means of an elasticity of the retractable device 13.

No matter whether the extending layer 121 is formed by the extension of the cover plate layer 122 of the flexible screen component 12 or the extension of the display layer 123 and the control layer 124 of the flexible screen component 12, the extending layer 121 has the same connection relationship with the retractable device 13. Taking an example in which the extending layer 121 extends from the cover plate layer 122, a fit relationship between the extending layer 121 and the retractable device 13 is illustrated as follows.

In the embodiment, as illustrated in FIG. 3, the retractable device 13 includes an elastic member 131. The elastic member 131 is mounted to a middle frame of the electronic device or a bracket 15 inside the device housing 11, or may be directly assembled and fitted with an inner side of the device housing 11, which is not limited in the present disclosure. In a width direction of the electronic device 1, an arrangement position of the elastic member 131 on the bracket 15 or the inner side of the device housing 11 may have a preset interval d from an end of the display region connected with the extending layer 121, such that an assembling surface of the extending layer 121 and the elastic member 131 may be arranged at an acute angle, thereby improving a pulling effect of the elastic member 131 on the extending layer 122. It should be noted that, the bracket 15 may be arranged at a position adjacent to the rear face 113, or at a middle part of the electronic device 1 in a thickness direction thereof, which is not limited in the present disclosure. The elastic member 131 is connected with the free end of the extending layer 121.

With the elastic member 131 being directly connected with the free end of the extending layer 121, the elastic member 131 and the extending layer 121 pull each other due to an elastic force of the elastic member 131. Taking an example in which one end of the flexible screen component 12 is provided with the extending layer as, when the flexible screen component 12 is assembled, firstly, the extending layer 121 of the flexible screen component 12 is connected with the elastic member 131, then the flexible screen component 12 winds around the assembling region 1121, the bent side face 113 and the front face 111, and further returns to the rear face 112 and winds around the rest assembling region 1121. In this case, the flexible screen component 12 is pulled, and the flexible screen component 12 is fixed to the device housing 11 through the adhesive layer 14, after the two ends of the display region of the flexible screen 12 are aligned with the two sides of the reserved region 1122 by means of the elasticity of the elastic member 131, respectively, so as to avoid a fit error between the flexible screen component 12 and the device housing 11 due to a dimensional tolerance of the flexible screen component 2 and hence to improve an assembling precision.

When the electronic device 1 including the above flexible screen component 12 is used, since one end of the flexible screen component 12 is connected with the retractable device 13, the risk of falling off of the flexible screen component 12 due to the bending stress generated by the corresponding bent side face 113 is avoided, and the service life of the flexible screen component 12 and the electronic device 1 is improved.

In some embodiments of the present disclosure, as illustrated in FIG. 4, which is a partially enlarged view of the electronic device in FIG. 2, the free end of the extending layer 121 is provided with a mounting hole 1211, and the extending layer 121 is configured to be connected to the retractable device 13 through the mounting hole 1211. In some embodiments of the present disclosure, the retractable device 13 may include a spring.

A first end of the spring may be fitted in the mounting hole 1211 of the extending layer 121, and a second end of the spring may be fixed to the middle frame of the electronic device or the bracket 15 inside the device housing 11, or may be directly assembled and fitted with the inner side of the device housing 11. It can be understood that the above arrangements are also applicable to the electronic device of the embodiment illustrated in FIG. 3.

By providing the mounting hole 1211 at the free end of the extending layer 121 and connecting it with the retractable device 13 or the elastic member 131, the structure is simple, and the connection strength of the extending layer 121 and the retractable device 13 or the elastic member 131 is ensured.

Alternatively, the extending layer 121 may also be connected to the retractable device 13 or the elastic member 131 by means of snapping, which is not limited in the present disclosure.

Figure 5:
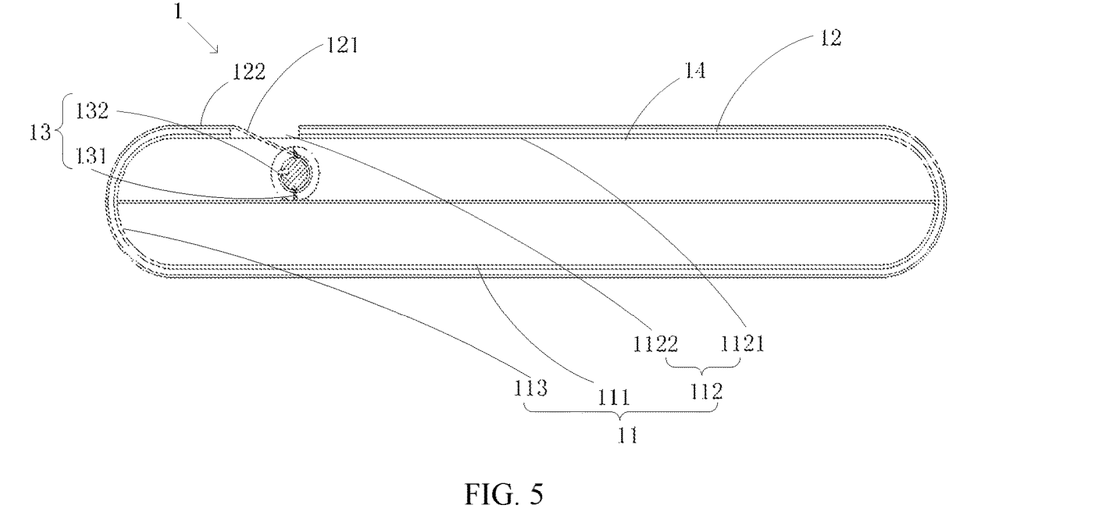
FIG. 5 is a schematic view of an electronic device in still another exemplary embodiment of the present disclosure.

In another embodiment, as illustrated in FIG. 5, the retractable device 13 includes an elastic member 131 and a rotating member 132. The rotating member 132 is connected with the elastic member 131 in a rotating direction, and the extending layer 121 is fixedly connected with the rotating member 132.

Further, the rotating member 132 is configured to rotate around a rotation center shaft, and the elastic member 131 has a first end connected to the rotating member 132, and a second end fixed to the bracket 15 inside the device housing 11. Further, a position where the rotating member 132 is connected with first end of the elastic member 131 does not coincide with the rotation center shaft of the rotating member 132, and even is away therefrom as much as possible, such that the elastic member 131 can have a good pulling effect on the rotating member 132 and thus the flexible screen component 12 during the rotation of the rotating member 132.

Figure 6:
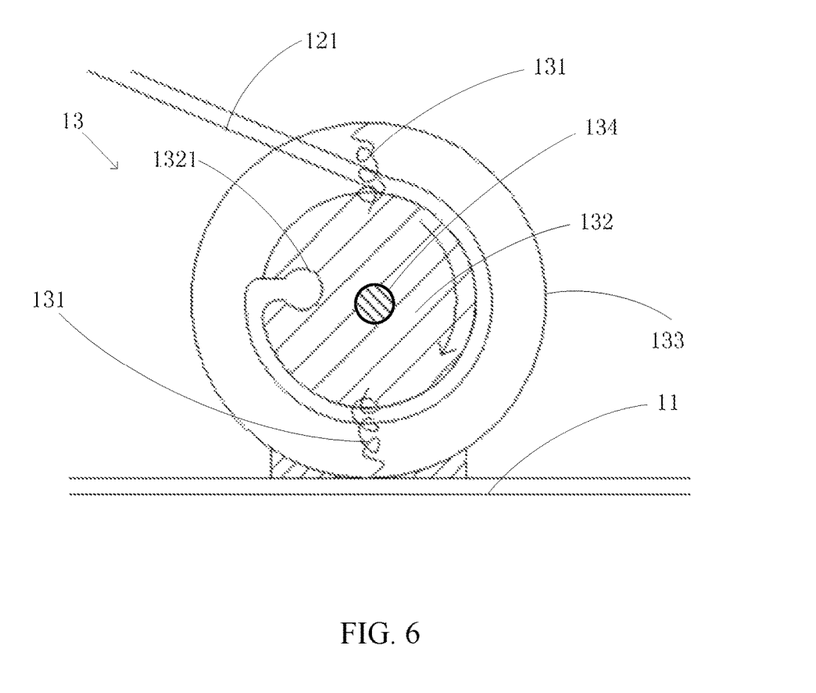
FIG. 6 is a schematic view illustrating a fit of an extending layer and a retractable device in an exemplary embodiment of the present disclosure.

In some other embodiments of the present disclosure, the second end of the elastic member 131 may also be fixed to the middle frame of the electronic device, or may be directly assembled and fitted with the inner side of the device housing 11, as shown in FIG. 6.

By the cooperation between the rotating member 132 and the elastic member 131, the rotating member 132 and the extending layer 121 can pull each other. Similarly, taking an example in which one end of the flexible screen component 12 is provided with the extending layer 121, when the flexible screen component 12 is assembled, firstly, the extending layer 121 of the flexible screen component 12 is fixedly connected to the rotating member 132, and then the flexible screen component 12 winds around the assembling region 1121, the bent side face 113 and the front face 111, and further returns to the rear face 112 and winds around the rest assembling region 1121. In this case, the flexible screen component 12 is pulled, the rotating member 132 is elastically rotated due to an elastic force of the elastic member 131, and the flexible screen component 12 is fixed to the device housing 11 by the adhesive layer 14, after the two ends of the display region of the flexible screen component 12 are aligned with the two sides of the reserved region 1122 by means of the above elastic force, respectively, so as to avoid a fit error between the flexible screen component 12 and the device housing 11 due to the dimensional tolerance of the flexible screen component 2 and hence to improve the assembling precision.

When the electronic device 1 including the above flexible screen component 12 is used, since one end of the flexible screen component 12 is connected with the retractable device 13, the risk of falling off of the flexible screen component 12 due to the bending stress generated by the corresponding bent side face 113 is avoided, and the service life of the flexible screen component 12 and the electronic device 1 is improved.

In the above embodiments, since the reserved region 1122 is a portion of the rear face 112 of the device housing 11, which is not covered by the flexible screen component 12, a hole may be formed in the reserved region 1122 to facilitate the extending layer 121 of the flexible screen component 12 to extend into the device housing 11 through the hole so as to be connected with the retractable device 13. In addition, a camera, a fingerprint identification module, a flashlight and other functional components may also be assembled to the reserved region 1122, which is not limited in the present disclosure.

The various device components, circuits, modules, units, blocks, or portions may have modular configurations, or are composed of discrete components, but nonetheless may be referred to as "modules" or "portions" in general. In other words, the "components," "circuits," "modules," "units," "blocks," or "portions" referred to herein may or may not be in modular forms.

Figure 7:
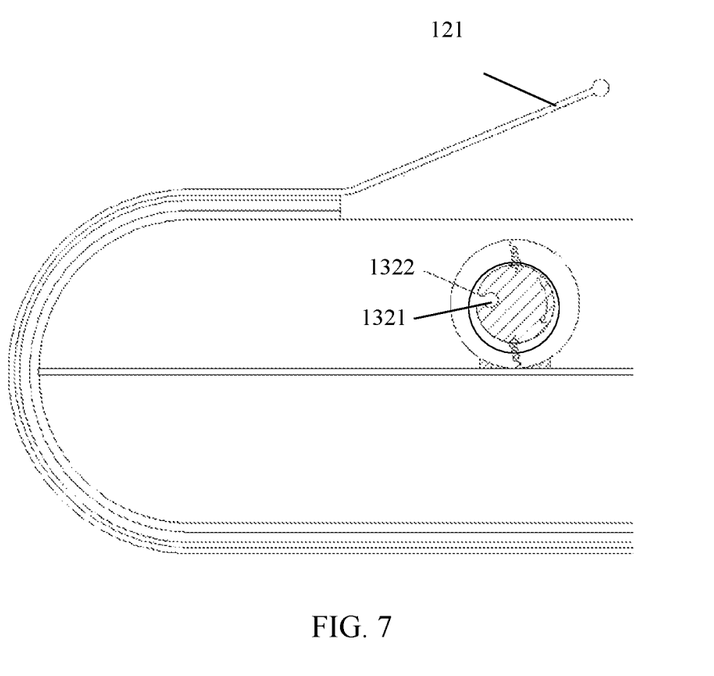
FIG. 7 is a partially enlarged view of an electronic device in yet another exemplary embodiment of the present disclosure, in which an extending layer has not been connected to a rotating member.

As illustrated in FIG. 6, the extending layer 121 establishes an indirect connection with the elastic member 131 by the rotating member 132, and thus the rotating member 132 may play a buffer role and enhance the stability of a displacement of the extending layer 121. In some other embodiments of the present disclosure, as illustrated in FIG. 7, the rotating member 132 may have a round edge provided with a groove 1322, and the extending layer 121 is winded in the groove 1322 to stabilize a stable assembling relationship between the extending layer 121 and the rotating member 132. Further, as illustrated in both FIGS. 6 and 7, the rotating member 132 is provided with a fitting part 1321, and the free end of the extending layer 121 has an interference fit with the fitting part 1321. This configuration avoids the structural improvement and destruction to the extending layer 121. The fitting part 1321 may be a hole formed in the rotating member 132. The free end of the extending layer 121 extends into the hole and is in an interference fit with the hole, thereby fixing the extending layer 121 with the rotating member 132. When the flexible screen component 12 is assembled or the flexible screen component 12 is subject to the bending stress, the extending layer 121 is pulled, and the rotating member 132 is rotated or has a rotating trend. However, the elastic force of the elastic member 131 provides the rotating member 132 with a counter acting force along the rotating direction, thereby improving the assembling precision and the connection reliability of the flexible screen component 22 and the housing of electronic device 1.

It should be noted that, one or more elastic members 131 may be provided, which is not limited in the present disclosure. When two elastic members 131 are provided, the two elastic members 131 may be symmetrically arranged to two opposite ends of the rotating member 132, as shown in FIG. 6, so as to provide the elastic force to overcome the stress or the pulling force from symmetrical directions, thus improving a pulling effect on the extending layer 121.

As further illustrated in FIG. 6, a hollow spherical or cylindrical member 133 is fixed to the inner side of the device housing 11, and the rotating member 132 is received in the hollow spherical or cylindrical member 133 and arranged concentrically therewith. The rotating member 132 is configured to rotate around a common center shaft 134 of the rotating member 132 and the hollow spherical or cylindrical member 133. Further, the two elastic members 131 having first ends symmetrically arranged to the two opposite ends of the rotating member 132, respectively, and second ends fixed to two opposite portions of the hollow spherical or cylindrical member 133, respectively.

By arranging the retractable device 13 in the device housing 11 and connecting the retractable device 13 with the extending layer 121 of the flexible screen component 12 in an elastic manner, the retractable device 13 pulls the flexible screen component 12 during assembling and using of the flexible screen component 12. With the above configuration, on one hand, the assembling can be achieved by pulling the flexible screen component 12, so as to prevent the dimensional tolerance of the flexible screen component 12 from affecting its fit with the device housing 11; on the other hand, the elastic pulling of the retractable device 13 can also overcome a separation stress caused by bending the flexible screen component 12 and hence improve a connection reliability between the flexible screen component 12 and the device housing 11.

It should be noted that the electronic device 1 can be a mobile phone, a tablet computer, an on-board device, a medical terminal, etc., which is not limited in the present disclosure.

It will be understood that when an element such as a layer, region, or other structure is referred to as being "on" or extending "onto" another element, it can be directly on or extend directly onto the other element or intervening elements can also be present. In contrast, when an element is referred to as being "directly on" or extending "directly onto" another element, there are no intervening elements present.

Likewise, it will be understood that when an element such as a layer, region, or substrate is referred to as being "over" or extending "over" another element, it can be directly over or extend directly over the other element or intervening elements can also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Relative terms such as "below" or "above" or "upper" or "lower" or "vertical" or "horizontal" can be used herein to describe a relationship of one element, layer, or region to another element, layer, or region as illustrated in the drawings. It will be understood that these terms and those discussed above are intended to encompass different orientations of the device in addition to the orientation depicted in the drawings.

The terms "first" and "second" are used for descriptive purposes only and are not to be construed as indicating or implying a relative importance or implicitly indicating the number of technical features indicated. Thus, elements referred to as "first" and "second" can include one or more of the features either explicitly or implicitly. In the description of the present disclosure, "a plurality" indicates two or more unless specifically defined otherwise.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It is to be understood that "multiple" mentioned in the present disclosure refers to two or more than two. The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof "And/or" describes an association relationship of associated objects and represent that three relationships can exist. For example, A and/or B can represent three conditions, i.e., independent existence of A, coexistence of A and B and independent existence of B. Character "/" usually represents that previous and next associated objects form an "or" relationship.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. An electronic device, comprising:
   a device housing comprising a front face, a rear face, and a bent side face connecting the front face with the rear face, the rear face comprising a reserved region, and an assembling region connected with the reserved region;
   a flexible screen component covering the front face, the bent side face, and the assembling region, and having a display region and an extending layer protruding from the display region, two ends of the display region being assembled and fitted with two sides of the reserved region, respectively; and
   a retractable device assembled in the device housing and connected with the extending layer,
   wherein the extending layer of the flexible screen component extends through the reserved region to be connected with the retractable device.

2. The electronic device according to claim 1, wherein the extending layer is formed by extending at least one of a cover plate layer, a display layer and a control layer of the flexible screen component.

3. The electronic device according to claim 2, wherein materials of the cover plate layer comprise polyimide materials.

4. The electronic device according to claim 1, wherein the reserved region comprises a hole, and the extending layer extends into the device housing to be connected with the retractable device through the hole.

5. The electronic device according to claim 1, wherein the retractable device comprises an elastic member connected with a free end of the extending layer.

6. The electronic device according to claim 5, wherein the free end of the extending layer is provided with a mounting hole, and at least a part of the elastic member is fitted in the mounting hole.

7. The electronic device according to claim 1, wherein the retractable device comprises an elastic member and a rotating member, the rotating member is connected with the elastic member, and the extending layer is fixedly connected with the rotating member.

8. The electronic device according to claim 7, wherein the rotating member comprises a round edge provided with a groove, and the extending layer is winded in the groove.

9. The electronic device according to claim 7, wherein the rotating member is provided with a fitting part, and the free end of the extending layer has an interference fit with the fitting part.

10. The electronic device according to claim 9, wherein the fitting part is configured as a hole, and the free end of the extending layer is received in the hole with an interference fit.

11. The electronic device according to claim 1, wherein the reserved region is arranged at a position on the rear face adjacent to the bent side face.

12. The electronic device according to claim 1, wherein the reserved region is arranged at a central position on the rear face.

13. The electronic device according to claim 1, further comprising an adhesive layer, wherein the flexible screen component is fixedly connected with the device housing by the adhesive layer.

14. The electronic device according to claim 1, wherein the retractable device and the extending layer of the flexible screen component are connected in an elastic manner.

15. The electronic device according to claim 14, wherein the retractable device is configured to pull the flexible screen component during assembling and using of the flexible screen component.

16. The electronic device according to claim 15, wherein the assembling is realized by pulling the flexible screen component, so as to prevent a dimensional tolerance of the flexible screen component from affecting its fit with the device housing.

17. The electronic device according to claim 16, wherein the pulling of the retractable device is an elastic pulling and configured to overcome a separation stress caused by bending the flexible screen component, thereby improving a connection reliability between the flexible screen component and the device housing.

18. The electronic device according to claim 17, wherein the flexible screen component comprises an organic light-emitting diode (OLED) screen.

19. The electronic device according to claim 18, wherein the electronic device is a mobile phone.

20. A method of assembly the electronic device according to claim 1, the method comprising:
pulling the flexible screen component, so as to prevent a dimensional tolerance of the flexible screen component from affecting its fit with the device housing;
wherein the pulling of the retractable device is an elastic pulling and configured to overcome a separation stress caused by bending the flexible screen component, thereby improving a connection reliability between the flexible screen component and the device housing.

* * * * *